(Model.)

S. H. FOUNTAIN.
COTTON SCRAPER AND CULTIVATOR.

No. 294,604. Patented Mar. 4, 1884.

WITNESSES:
John R. Deemer
C. Sedgwick

INVENTOR:
S. H. Fountain
BY Munn & Co.
ATTORNEYS.

N. PETERS, Photo-Lithographer, Washington, D. C.

UNITED STATES PATENT OFFICE.

SETH HAMPTON FOUNTAIN, OF AMITE CITY, LOUISIANA.

COTTON SCRAPER AND CULTIVATOR.

SPECIFICATION forming part of Letters Patent No. 294,604, dated March 4, 1884.

Application filed July 17, 1883. (Model.)

*To all whom it may concern:*

Be it known that I, SETH H. FOUNTAIN, of Amite City, in the parish of Tangipahoa, in the State of Louisiana, have invented a new and Improved Cotton Scraper and Cultivator, of which the following is a full, clear, and exact description.

The object of my invention is to provide a simple, inexpensive, and practical machine for the cultivation of cotton or other plants when small, to promote their more vigorous growth and insure a larger crop.

Reference is to be had to the accompanying drawings, forming a part of this specification, in which similar letters of reference indicate corresponding parts in both the figures.

Figure 1:
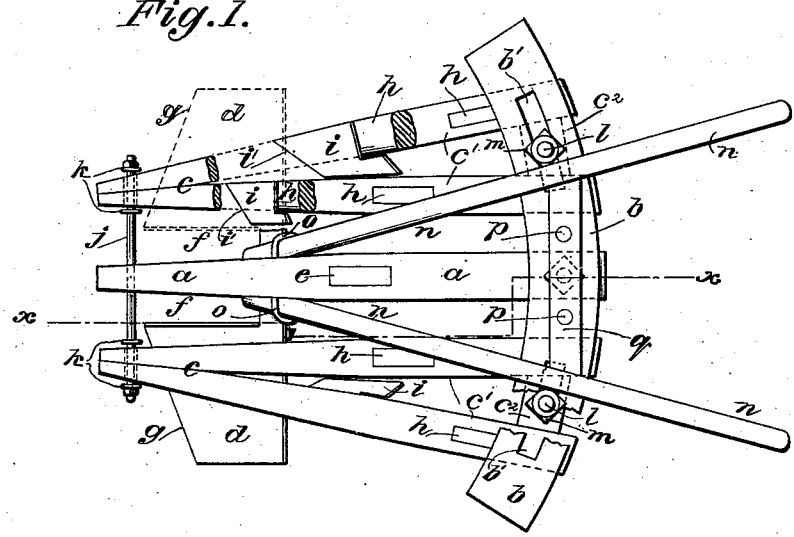
Figure 2:
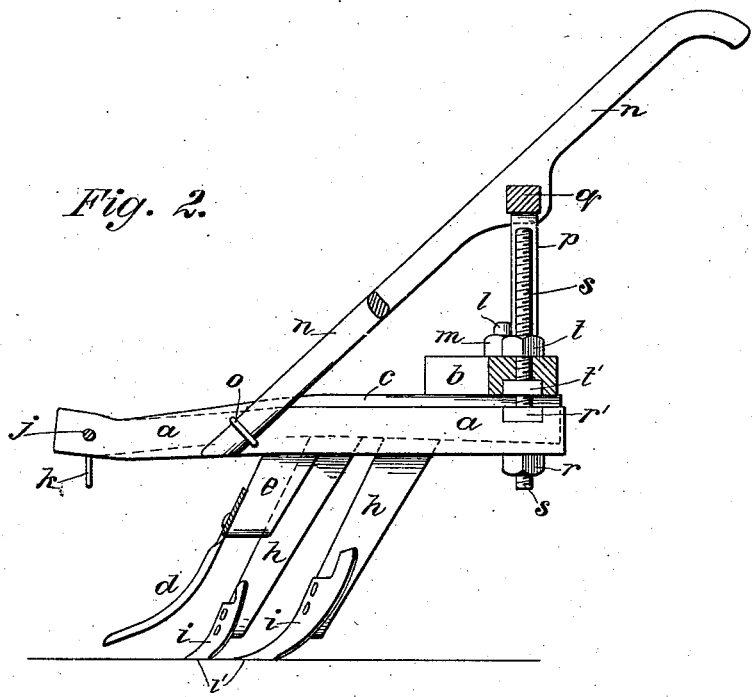

Figure 1 is a plan view of my improvement, partly broken away; and Fig. 2 is a sectional side elevation thereof on the line $x\ x$, Fig. 1.

The main frame of the machine consists of a central beam, $a$, to which the scrapers are connected, a rear curved plate or transverse bar, $b$, and two <-shaped shovel-plow beams, $c$, one at each side of the central beam, $a$.

To the beam $a$ the two side scrapers, $d$, are fastened by bolting into the short stock $e$, projecting from the beam; and said scrapers may consist of a single plate cut away to leave a gap, $f$, at the center between the scraper-blades for passage over the growing plants, while the outwardly and rearwardly inclined forward edges, $g$, of the scrapers act at each side of the rows of plants to cut away weedy growths and trash and deposit such in the furrows between the drills, and without disturbing the plants. These side scrapers, $d$, however, may be separately formed and connected to beam $a$ in any approved manner.

Behind each scraper $d$, I connect to each arm $c'$ of the frames $c$ by a suitably-fitted stock, $h$, a cultivating shovel or plow, $i$—one pair of plows $i$ to each scraper $d$—and the pair of plows for each scraper being arranged one in advance of the other, and the forward edges, $i'$, of the plows $i$ being inclined reversely to the edges of the scrapers $d$, on the same side, so that the pair of plows $i$ behind each scraper shall act to heap up the clean fresh earth around the bases or roots of the plants, after the weeds and trash are thrown to one side by the scrapers $d$, thereby providing for the cultivation of both sides of the row of plants by one passage over them of the machine, thus effecting a large saving over their cultivation by hand with hoes in the usual manner, and doing the work better, because more effectually killing the growth of the weeds, in favor of a sturdy growth of the plants.

Where the arms $c'$ of the <-frames $c$ are rigidly connected together at the front, and also through the forward end of the beam $a$, I pass the rod or bar $j$ through these frames and beam, to which bar $j$ the draft-clevises $k$ are suitably attached, said clevises connecting with bar $j$ at each side of the frames $c$, to maintain the front ends of the frames in about the same position sidewise. The rear ends of each pair of arms $c'$ are rigidly connected by a cross-bar, $c^2$, in which is rigidly held the screw-bolt $l$, which passes through the slot $b'$ of the bar $b$, so that when the nut $m$ of bolt $l$ is loosened the bolt may be swung through the slot to carry the rear end of the frame $c$ toward the beam $a$, or from it, as required by the condition of the soil, the plows $i$ of beams $c$ being set by bolts and nuts $l\ m$ nearer the beam $a$ when the earth is dry, and farther from the beam $a$ when the earth is wet, so that a proper quantity of earth may always be heaped up about the plants at any time required, and permitting the work to be properly done without loss of time.

The handles $n$ of the machine are suitably fitted in loop or eye plates $o$ of beam $a$, branch outward and upward therefrom, and are suitably jointed to a frame of standards, $p$, and cross-bar $q$, supported from and fixed to the transverse bar $b$ of the main frame.

It is desirable to arrange the scrapers $d$ to work at greater or less depth in the soil. This I accomplish by fixing rigidly to the end of beam $a$, by set-nuts $r\ r'$ or otherwise, the screw-bolt $s$, which has on it, above and below the frame-bar $b$, the movable set-nuts $t\ t'$, by adjusting which the rear end of beam $a$ may be swung up or down on the forward bar, $j$, as a pivot, so as to set the scrapers $d$ vertically, the joints of the handles $n$ with the beam $a$ and frame $p\ q$ being arranged to allow the required range of vertical movement of the beam.

Thus constructed, my improved cultivator is adapted to speedily cultivate cotton and other plants, and it is believed that its use will effect a great saving in time and labor, thus insuring a larger crop at less expense.

I do not abandon or dedicate to the public any patentable feature set forth herein and not hereinafter claimed, but reserve the right to claim the same either in a reissue of any patent that may be granted upon this application or in other applications for Letters Patent that I may make.

Having thus described my invention, I claim as new and desire to secure by Letters Patent—

1. The combination, in a cotton-cultivator, of the two front scrapers, beveled at $g$, and having an open space between them, and two shovels, $i\ i$, arranged in the rear of each scraper, the scrapers being made vertically adjustable and the plows laterally adjustable, as and for the purpose specified.

2. The bar $b$, bolt $j$, screw-bolt $s$, and nuts $r\ r'\ t\ t'$, in combination with the beam $a$, handles $n$, and frame $p\ q$, jointed together to allow the scrapers to be graduated in depth, as described.

SETH HAMPTON FOUNTAIN.

Witnesses:
ED JAGER,
V. CASTAMG.